(No Model.)

O. ZWIETUSCH.
Method of Preserving the Flavor of Fermented Liquors, &c.

No. 229,934. Patented July 13, 1880.

Witnesses:
E. L. Osmus
Charles F. Hunter

Inventor:
Otto Zwietusch
per S. S. Stout
Attorney

UNITED STATES PATENT OFFICE.

OTTO ZWIETUSCH, OF MILWAUKEE, WISCONSIN.

METHOD OF PRESERVING THE FLAVOR OF FERMENTED LIQUORS, &c.

SPECIFICATION forming part of Letters Patent No. 229,934, dated July 13, 1880.

Application filed March 3, 1880. (No model.)

*To all whom it may concern:*

Be it known that I, OTTO ZWIETUSCH, of Milwaukee, in the county of Milwaukee, and in the State of Wisconsin, have invented a certain new and useful method of preserving the flavor of fermented liquors while on draft and utilizing the carbonic-acid gas given off from fermented liquors; and I do hereby declare that the following is a full, clear, and exact description thereof.

My invention relates to the preservation of the flavor of fermented liquors while the same are on draft, and for this purpose I utilize carbonic-acid gas which is charged or flavored with the aroma arising from fermented liquors; and said aroma-charged gas, which is now allowed to escape and is wasted, may be obtained from several sources—as, for instance, from casks or packages from which fermented liquors have been drawn, in which case it will be necessary to employ valves or automatic stoppers to prevent the escape of gas when the liquor is drawn, or from brewing-tubs, in which case it will be necessary to provide means of collecting and storing the gas.

In the accompanying drawings I have shown means adapted to both of the purposes specified; and, furthermore, as it is desirable, as far as possible, to avoid the admission of air, which, together with the loss of gas, renders beer and like liquors flat and unpalatable, I have shown devices for charging an initial cask with ordinary carbonic-acid gas, from which, instead of from the outer air, the pressure to supply the vacuum in the initial draft-cask may be had, thus avoiding the direct admission of air to the initial draft-cask. If, however, air is admitted to supply the vacuum in the first draft-cask of a series, and is caused to pass with the waste gas through the several barrels of the series, a time will come, owing to the different gravities of the air and gas and the accumulation of gas from the several casks, that the air will be so charged with gas, &c., as to all practical intents to become the equivalent of pure aroma-charged gas arising from fermented liquors. Therefore it is not essential that the initial cask be charged with carbonic-acid gas.

I will now proceed to describe my invention so that others skilled in the art to which it appertains may apply the same.

Figure 1:
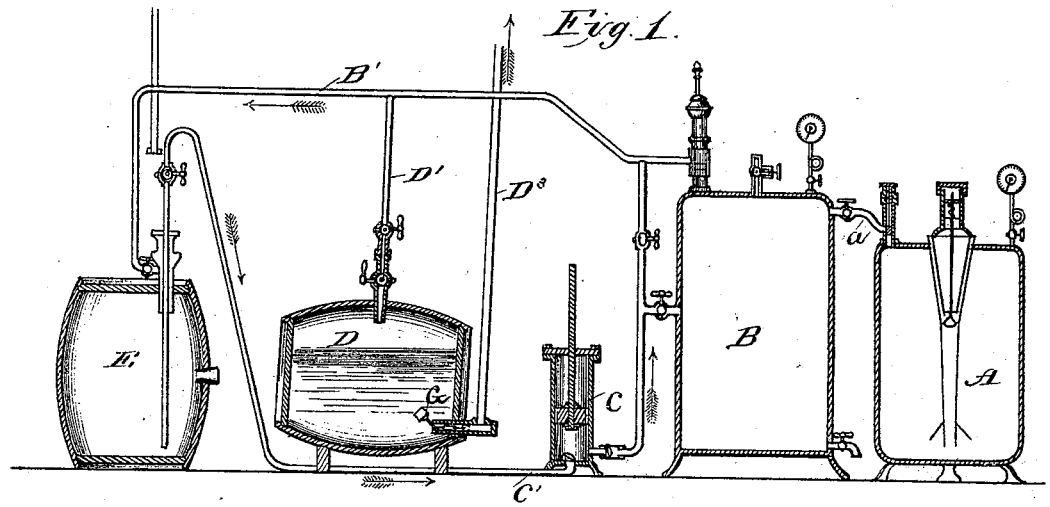
Figure 2:
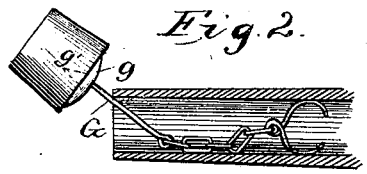
Figure 3:
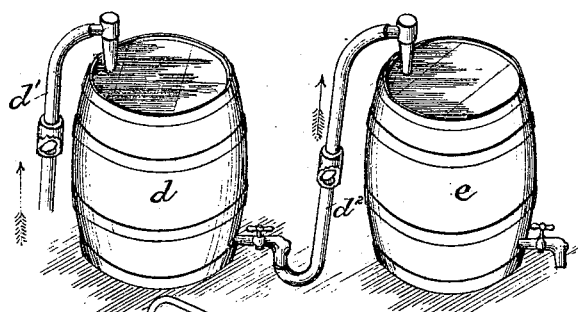
Figure 4:
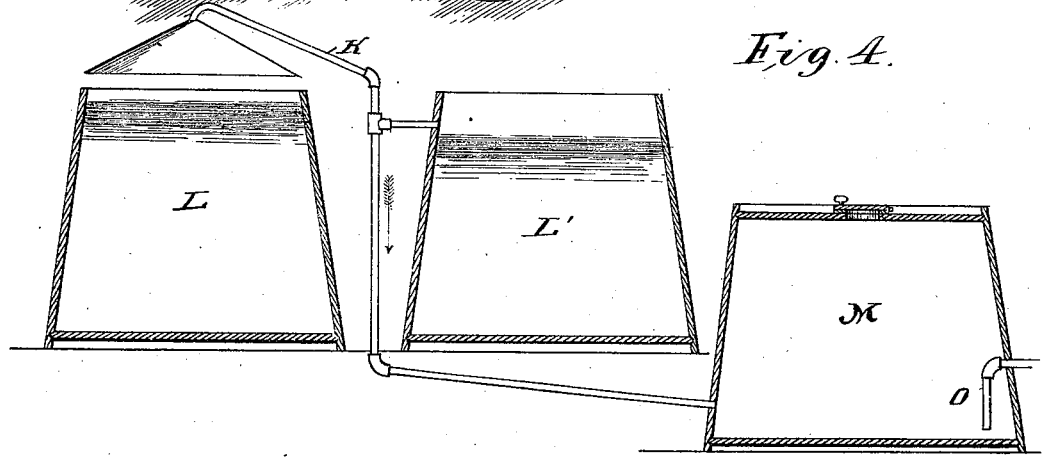

In the drawings, Figure 1 is a sectional view of a carbonic-acid-gas generator, reservoir, force-pump, and beer-casks. Fig. 2 is a sectional view of a portion of a spigot, showing my device for stopping the outflow of gas after the beer in a cask has been exhausted. Fig. 3 illustrates a method of carrying out my process in the consumption or drawing off of beer; Fig. 4, a sectional view of two brewing-tubs and a tank or reservoir, further illustrating my process.

A, Fig. 1, is a generator provided with the usual safety-valves, &c., and connected with a reservoir, B, by a tube, $a$. C is a pump, and D and E are casks.

All of the beer has been drawn out of the cask E, leaving a quantity of carbonic-acid gas intermingled with the aroma of beer, and if this aromatic gas is not to be used immediately it is drawn out through pipe $c'$ into the tank or reservoir B by a pump, C; or, if beer is being drawn from cask D to a room above through the pipe $D^3$, the pipe $D'$ should be connected with $B'$, so that as beer is being drawn from the cask D its place will be taken by the aromatic gas from cask E.

To guard against the escape of gas after a cask has been emptied of its beer, I provide an anchored stopper, G, which I attach in the spigot by a flexible connection. This anchored stopper has a shoulder, $g$, and spike $g'$. As the spigot is being forced into the bung-hole the spike $g'$ will enter the bung or stopper, and, remaining fast therein, prevent the stopper from floating off, though it will allow it to rise sufficiently to permit a free egress of the beer until it reaches a point on a level with the spigot, when it will float the shoulder into it and stop it against any outflow of gas. The cask D will now contain nothing but carbonic-acid gas impregnated with the aroma of beer, and upon the cask E being replaced by a full one the operation may be reversed, the cask D furnishing gas for supplying the place of the beer drawn from the new cask, and thus the same gas may be used over and over again, and will gain each time additional flavor. In the beginning of this feature of my process the first cask E should be charged with gas from the reservoir B through pipe B'.

In Fig. 3 I illustrate another feature of my process, by which I charge atmospheric air gradually with carbonic-acid gas impregnated with the aroma of beer.

$d$ is a cask which has lately contained beer. $e$ is another from which beer is being drawn. $d'$ is an air-tube having in it an upwardly-opening valve, while $d^2$ is a pipe, also having an upwardly-opening valve, and which connects the two casks.

The beer taken from $e$ leaves a vacuum, which is immediately filled from $d$, which latter gets a sufficient supply of atmospheric air through tube $d'$ to keep up the pressure. Upon cask $e$ being emptied of its beer a full cask can be connected with it by another tube, $d^2$, and the process continued and the gas reused indefinitely, the air first admitted getting richer in carbonic-acid gas and beer-aroma by each successive use.

In saving the carbonic-acid gas generated in the brewing-tubs, which has heretofore been conducted out of the building, I provide the fermenting-tubs L L' with a tube, K, having a hood, which it holds suspended over tub L, and this tube leads down to a carbonic-acid-gas tank, M, situated below the level of the tubs, and having an exit-pipe, O, through which the gas may be drawn out and distributed by a pump, as shown in Fig. 1, so that as gas is pumped from the gas-tank M the suction created will draw off a supply to take its place from the tubs.

By my process I also save and utilize the gas generated in the second fermentation or shavings casks, which are closed by connecting them with a pipe which leads to a gas-tank.

In describing my process I have only mentioned beer as the liquor treated; but it is evident that this process will apply to any fermented liquor or liquor which is charged with carbonic-acid gas.

What I claim is—

1. The method herein described of preserving the flavor of fermented liquors while on draft and utilizing the carbonic-acid gas given off from fermented liquors, which consists in conducting the gas charged with the aromatic vapors from a previously exhausted barrel or package into the draft-vessel or package, substantially as and for the purpose specified.

2. The method of flavoring carbonic-acid gas by passing it successively through casks from which fermented liquor has been drawn, as described.

3. The anchored stopper G, flexibly connected in the spigot of a cask, having a spike for entering and retaining the bung and a shoulder for closing the entrance of the spigot against pressure from the inside, as set forth.

In testimony that I claim the foregoing I have hereunto set my hand this 21st day of February, 1880.

OTTO ZWIETUSCH.

Witnesses:
ROBT. LUSCOMBE,
STANLEY S. STOUT.